(12) United States Patent
Siow et al.

(10) Patent No.: US 6,511,227 B1
(45) Date of Patent: Jan. 28, 2003

(54) REMOVABLE BEARING

(75) Inventors: We-Lym Darren Siow, Singapore (SG); Ching Yong Chua, Singapore (SG); Pui Wen Huang, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 10/039,493

(22) Filed: Oct. 26, 2001

(51) Int. Cl.[7] .................................................. F16C 17/02

(52) U.S. Cl. ........................ 384/428; 384/296; 400/625

(58) Field of Search ................................. 384/428, 296, 384/295, 439

(56) References Cited

U.S. PATENT DOCUMENTS 5,288,152 A * 2/1994 Davies ........................ 384/220
5,738,454 A * 4/1998 Zepeda et al. .............. 400/625
5,845,947 A * 12/1998 Arabia et al. ............... 384/428

* cited by examiner

Primary Examiner—Lenard A. Footland

(57) ABSTRACT

A removable bearing for mounting on a slot of a supporting wall is disclosed. The removable bearing includes a bearing member having a bore for receiving a rotatable shaft. The bearing also includes a handle fixedly attached to the bearing member. Attached to the handle is a latching member for engaging a corresponding aperture in the supporting wall when mounting the removable bearing thereon. The handle has an engagement portion that allows tool engagement for moving the handle away from the supporting wall to disengage the latching member when removing the bearing from the slot.

3 Claims, 2 Drawing Sheets

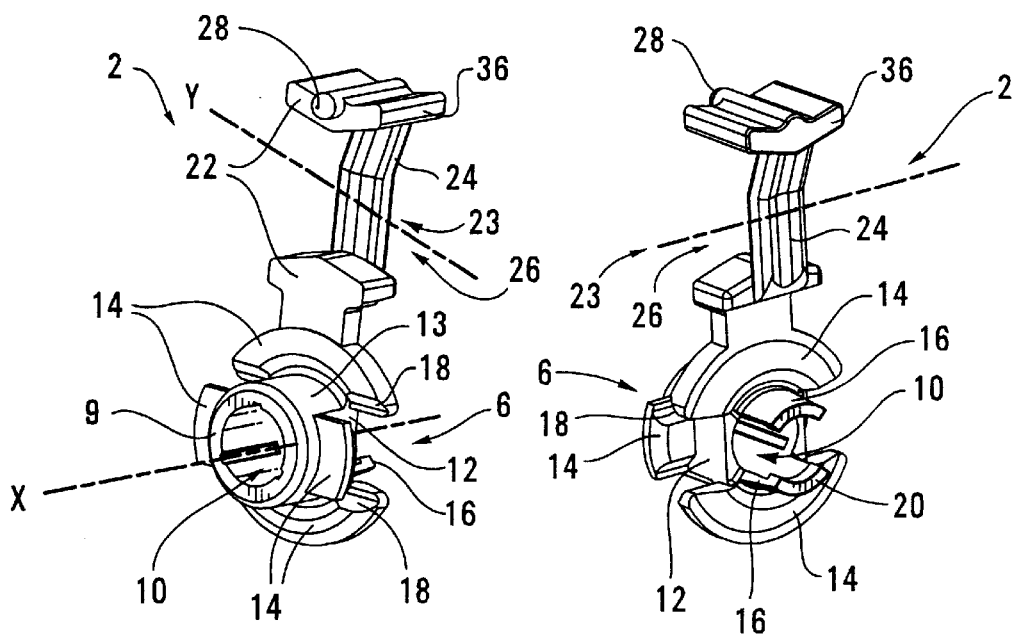
*Figure 2*  *Figure 3*
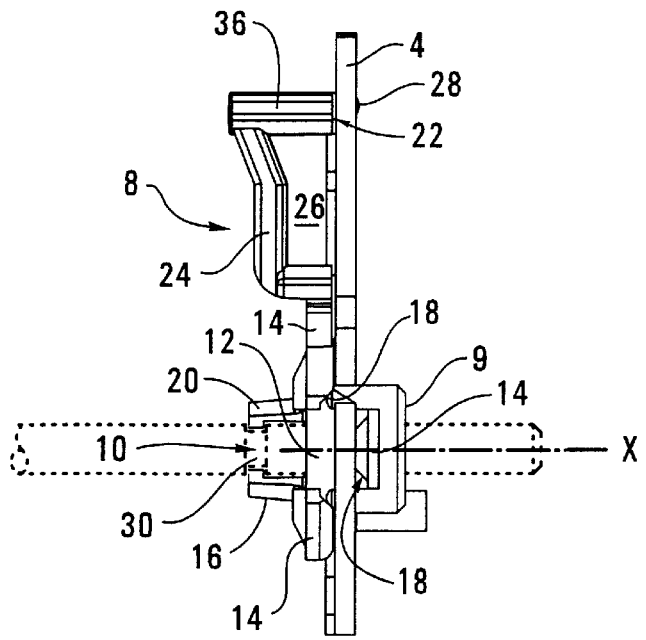
*Figure 4*

REMOVABLE BEARING

BACKGROUND

This invention relates, generally, to a bearing for supporting a rotatable shaft, and more specifically, to such a bearing that is easily removable when mounted in a narrow and difficult to access place.

Plastic bearings are used in devices such as printers for supporting a rotatable pick roller shaft. These bearings usually wear out through prolonged use and frequently need to be replaced. Pick rollers mounted on the pick roller shaft also require periodical servicing or replacement. Such tasks require the bearings to be removable to allow the pick roller shaft mounted therein to be removed.

Removal of prior art bearings is cumbersome. Sometimes, different tools are required for removing a single bearing. For a service person who has to service many units of printers daily, it is desirable to have a bearing that can be easily removed.

SUMMARY

According to the present invention, there is provided a removable bearing for mounting on a slot of a supporting wall. The removable bearing includes a bearing member having a bore for receiving a rotatable shaft and a handle fixedly attached to the bearing member. Attached to the handle is a latching member for engaging a corresponding aperture in the supporting wall when one mounts the removable bearing thereon. The handle has an engagement portion that allows tool engagement for moving the handle away from the supporting wall to disengage the latching member when one is removing the bearing from the slot.

BRIEF DESCRIPTION OF DRAWINGS

The invention will be better understood with reference to the drawings, in which:

FIG. 2 is an isometric drawing of the removable bearing in FIG. 1 viewed in a direction according to an arrow A;

FIG. 3 is an isometric drawing of the removable bearing in FIG. 1 viewed in a direction according to an arrow B; and FIG. 4 is a side elevation drawing of the removable bearing in FIG. 1 viewed in a direction according to an arrow C.

DETAILED DESCRIPTION

Figure 1:
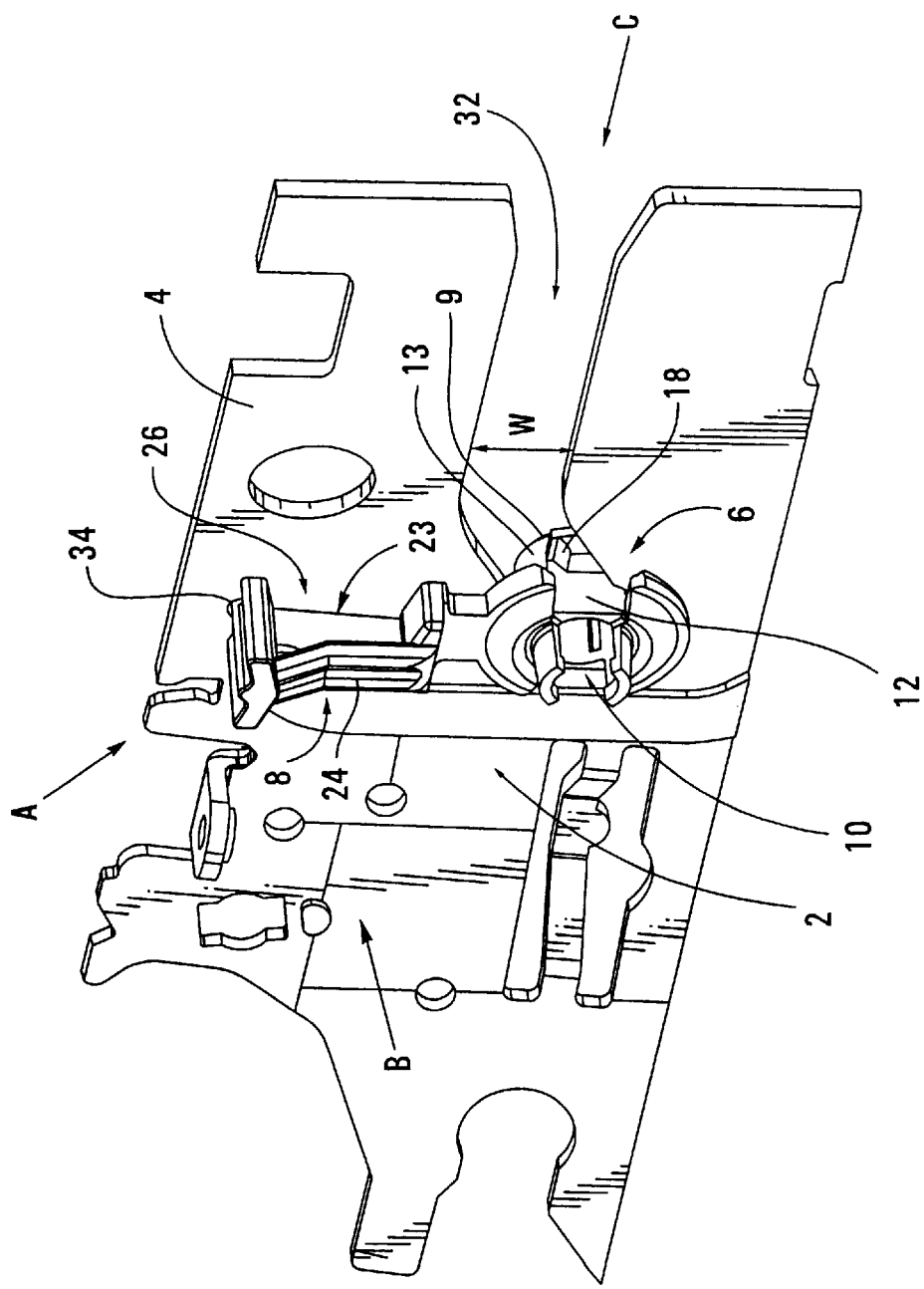
FIG. 1 is an isometric drawing of a removable bearing according to the present invention shown being mounted on a supporting wall.

FIG. 1 shows a removable bearing 2 according to the present invention being mounted on a supporting wall 4. The removable bearing 2 includes a bearing member 6 and a handle 8 fixedly attached to the bearing member 6. The bearing member 6 and the handle 8 are integrally molded out of a plastic material such as polyoxymethylene (POM). Those skilled in the art will recognize that other materials can be used.

FIGS. 2 and 3 show the removable bearing 2 seen in directions indicated by arrows A and B in FIG. 1 respectively. The bearing member 2 has a tubular core 9 that has a bore 10 for receiving a rotatable shaft 11 (FIG. 4). The bore has an axis X. The exterior of the core 9 is recessed to define a narrower recessed portion 12 and a non-recessed portion 13. The bearing member 6 includes flanges 14 radially extending from the core 9. The bearing member 6 also includes fingers 16 axially extending from one end of the core 9. The flanges 14 have chamfered edges 18. The fingers 16 have latching end portions 20 that are inwardly extending to define a constriction.

The handle 8 has a supporting wall facing surface 22. The handle 8 includes an engagement portion generally indicated by a numeral 23. The engagement portion 23 allows a tool to be used to engage the handle 8 as will be described shortly. As shown in FIGS. 1–4, the engagement portion 23 may be formed by a portion 24 of the handle 8 that is offset from the supporting wall-facing surface 22 to define a void 26 therebetween. Alternatively, the engagement portion 23 may be defined by a handle 8 portion having a void (not shown) therein. The void has an axis Y that is orthogonal to the axis X. The engagement portion 23 may be defined by a hook (not shown) spaced apart from the handle 8. On a distal end of the handle projecting from the supporting wall facing surface 22 is a latching member 28 shown in FIGS. 1–4 as a latching pin 28.

FIG. 4 shows a side view of the removable bearing 2 and supporting wall 4 viewed in a direction according to an arrow C in FIG. 1. FIG. 4 also shows the shaft 11 inserted through the bore 10 for rotating therein. Typically two removable bearings 2 are used to support the two end portions of the shaft 11. The following however only describes the installation of the bearing 2 at one of the ends.

During installation, the shaft 11 is inserted into the bore 10 until the two end portions 20 latch onto an annular groove 30 on the shaft 11 to allow the bearing 2 to be retained thereon. The combination of the bearing 2 and the shaft 11 is then ready to be mounted on the supporting wall 4. A service person holds the combination by the handle 8 and inserts the bearing 2 into a slot 32 cut or stamped on the supporting wall 4. The flanges 14 of the bearing member 6 flank the supporting wall 4 to allow the bearing 2 to be guided into the slot 32. The general width W (FIG. 1) of the slot 32 along most of its length is about the width of the narrower portion 12 of the core 9. The slot 32 has a slightly bulbous end (not shown) having a width slightly larger than the general width W of the slot 32. When the bearing member 6 is inserted to the bulbous end, the handle 8 is flexed away from the supporting wall 4 so that the latching pin 28 is allowed to ride on the supporting wall 4. When in this position, the handle 8 is rotated to turn the bearing member 6 until the non-recessed portion 13 is lodged in the bulbous end. Such a design ensures that core 9 does not easily slip out of the end of the slot 32. The chamfered edges 18 of the flanges 14 allow the bearing member 6 to be easily inserted into the slot 32 and rotated about the bulbous end. As the handle 8 is rotated, there will come a point when the latching pin 28 is aligned with a wall aperture 34. At this point, the handle 8 snaps back to its original position to lodge the latching pin 28 in the wall aperture 34 to effect engagement therebetween. In this position, the bearing 2 is firmly held in place against the supporting wall 4.

To remove the bearing 2, the service person inserts a tip of a hand tool (not shown), such as a flat head screwdriver or a pair of tweezers, in the void 26 formed between the handle 8 and the supporting wall 4. The service person then pries the handle 8 to disengage the retaining pin 28 from the wall aperture 34. And with a lifting action of the wrist, the tip of the hand tool is allowed to engage an end portion 36 of the handle 8 to rotate the handle 8 outwards. The bearing 2 can then be gripped by the end portion 36 and drawn out of the slot 32. Advantageously, the design of the bearing 2 facilitates removal by a service person.

We claim:

1. A removable bearing for mounting on a slot of a supporting wall for supporting a rotatable shaft, the removable bearing comprising:

a bearing member having a bore for receiving the shaft;

a handle attached to the bearing member, the handle having an engagement portion; and a latching member attached to the handle for engaging a corresponding aperture in the supporting wall when the removable bearing is mounted thereon;

wherein the engagement portion allows tool engagement for moving the handle away from the supporting wall to disengage the latching member when removing the bearing from the slot.

2. A removable bearing according to claim 1, wherein the engagement portion is a portion of the handle that defines a void.

3. A removable bearing according to claim 2, wherein the portion of the handle that defines a void includes a portion of the handle being offset from a supporting wall facing surface of the handle.

* * * * *